United States Patent
Bravo et al.

(10) Patent No.: US 8,838,988 B2
(45) Date of Patent: Sep. 16, 2014

(54) VERIFICATION OF TRANSACTIONAL INTEGRITY

(75) Inventors: Jose F. Bravo, Mamaroneck, NY (US); Jeffery L. Crume, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 13/084,823

(22) Filed: Apr. 12, 2011

(65) Prior Publication Data
US 2012/0264405 A1    Oct. 18, 2012

(51) Int. Cl.
*H04L 29/06* (2006.01)

(52) U.S. Cl.
USPC ......................................................... 713/183

(58) Field of Classification Search
USPC ......................................................... 713/183
See application file for complete search history.

(56) References Cited

U.S. PATENT DOCUMENTS

| | | | |
|---|---|---|---|
| 4,310,720 A | 1/1982 | Check, Jr. | |
| 5,046,082 A | 9/1991 | Zicker et al. | |
| 5,068,894 A | 11/1991 | Hoppe | |
| 5,323,465 A | 6/1994 | Avarne | |
| 5,457,737 A | 10/1995 | Wen | |
| 5,491,752 A | 2/1996 | Kaufman et al. | |
| 5,497,411 A | 3/1996 | Pellerin | |
| 5,657,388 A | 8/1997 | Weiss | |
| 5,684,950 A | 11/1997 | Dare et al. | |
| 5,701,339 A | 12/1997 | Suda | |
| 5,749,052 A | 5/1998 | Hidem et al. | |
| 5,841,871 A | 11/1998 | Pinkas | |
| 5,842,124 A | 11/1998 | Kenagy et al. | |
| 5,892,902 A | 4/1999 | Clark | |
| 5,953,422 A | 9/1999 | Angelo et al. | |
| 5,971,272 A | 10/1999 | Hsiao | |
| 6,000,031 A | 12/1999 | Bingaman et al. | |
| 6,169,890 B1 | 1/2001 | Vatanen | |
| 6,278,863 B1 | 8/2001 | Mabrouki | |

(Continued)

FOREIGN PATENT DOCUMENTS

| | | |
|---|---|---|
| EP | 1119147 A1 | 7/2001 |
| GB | 2456509 A | 7/2009 |

(Continued)

OTHER PUBLICATIONS

Transaction Verification, PhoneFactor Product Information, PhoneFactor Inc., Dec. 7, 2010, 1 page, http://www.webcitation.org/5unLaf84Y.

(Continued)

*Primary Examiner* — Jason Gee
(74) *Attorney, Agent, or Firm* — Douglas A. Lashmit; Hoffman Warnick LLC (57) ABSTRACT

Aspects of the present invention provide a solution for verifying the integrity of a transaction. In response to receipt of a confirmed electronic transaction from a user, a one time password is forwarded to the user. The user then initiates a telephonic communication with a verifier on the user's wireless device and provides the one time password to the verifier. The verifier authenticates the mobile telephonic device based on the device's caller identification number and determines whether the one time password provided by the user matches the one forwarded to the user. After the user is authenticated, the verifier communicates the details of the transaction that were received and the user confirms whether the details match those originally entered.

20 Claims, 2 Drawing Sheets

(56) References Cited

U.S. PATENT DOCUMENTS

| | | | |
|---|---|---|---|
| 6,308,268 B1 | 10/2001 | Audebert | |
| 6,324,271 B1 | 11/2001 | Sawyer et al. | |
| 6,330,608 B1 | 12/2001 | Stiles | |
| 6,334,056 B1 | 12/2001 | Holmes et al. | |
| 6,338,140 B1 | 1/2002 | Owens et al. | |
| 6,349,134 B1 | 2/2002 | Katz | |
| 6,385,729 B1 | 5/2002 | DiGiorgio et al. | |
| 6,387,729 B2 | 5/2002 | Eng et al. | |
| 6,393,468 B1 | 5/2002 | McGee | |
| 6,400,726 B1 | 6/2002 | Piret et al. | |
| 6,466,780 B1 | 10/2002 | Geiselman et al. | |
| 6,535,726 B1 | 3/2003 | Johnson | |
| 6,584,309 B1 | 6/2003 | Whigham | |
| 6,687,241 B1 | 2/2004 | Goss | |
| 6,707,915 B1 | 3/2004 | Jobst et al. | |
| 6,731,731 B1 | 5/2004 | Ueshima | |
| 6,993,658 B1 | 1/2006 | Engberg et al. | |
| 6,993,663 B1 | 1/2006 | Paya et al. | |
| 7,007,301 B2 | 2/2006 | Crosbie et al. | |
| 7,024,688 B1 | 4/2006 | Faccin et al. | |
| 7,028,179 B2 | 4/2006 | Anderson et al. | |
| 7,058,968 B2 | 6/2006 | Rowland et al. | |
| 7,100,204 B1 | 8/2006 | Myllymaki et al. | |
| 7,133,662 B2 | 11/2006 | Bravo et al. | |
| 7,142,840 B1 | 11/2006 | Geddes et al. | |
| 7,290,278 B2 | 10/2007 | Cahill et al. | |
| 7,337,431 B1 | 2/2008 | Barnes et al. | |
| 7,357,310 B2 | 4/2008 | Calabrese et al. | |
| 7,379,921 B1 | 5/2008 | Kiliccote | |
| 7,380,708 B1 | 6/2008 | Kiliccote | |
| 7,447,494 B2 | 11/2008 | Law et al. | |
| 7,519,989 B2 | 4/2009 | Lin et al. | |
| 7,540,022 B2 | 5/2009 | Barrari et al. | |
| 7,600,676 B1* | 10/2009 | Rados et al. | 235/380 |
| 7,665,128 B2 | 2/2010 | Yang | |
| 7,715,823 B2 | 5/2010 | Bravo et al. | |
| 7,716,742 B1 | 5/2010 | Roesch et al. | |
| 7,765,584 B2 | 7/2010 | Roskind | |
| 7,823,199 B1 | 10/2010 | Rathi et al. | |
| 7,845,004 B2 | 11/2010 | Bardsley et al. | |
| 7,886,346 B2 | 2/2011 | Sandhu et al. | |
| 7,926,108 B2 | 4/2011 | Rand et al. | |
| 7,930,540 B2 | 4/2011 | Ahuja et al. | |
| 7,954,150 B2 | 5/2011 | Croft et al. | |
| 8,151,327 B2 | 4/2012 | Eisen | |
| 8,181,248 B2 | 5/2012 | Oh et al. | |
| 8,285,639 B2 | 10/2012 | Eden et al. | |
| 8,302,180 B1 | 10/2012 | Gudov et al. | |
| 2001/0054155 A1 | 12/2001 | Hagan et al. | |
| 2002/0069165 A1 | 6/2002 | O'Neil | |
| 2002/0091931 A1 | 7/2002 | Quick et al. | |
| 2002/0095588 A1 | 7/2002 | Shigematsu et al. | |
| 2002/0178070 A1 | 11/2002 | Leveridge | |
| 2002/0178370 A1 | 11/2002 | Gurevich et al. | |
| 2003/0014315 A1 | 1/2003 | Jaalinoja et al. | |
| 2003/0154382 A1 | 8/2003 | Vicard | |
| 2003/0172272 A1 | 9/2003 | Ehlers et al. | |
| 2004/0148520 A1 | 7/2004 | Talpade et al. | |
| 2004/0152446 A1 | 8/2004 | Saunders et al. | |
| 2004/0198329 A1 | 10/2004 | Vasa | |
| 2004/0243856 A1* | 12/2004 | Shatford | 713/202 |
| 2005/0015624 A1 | 1/2005 | Ginter et al. | |
| 2005/0022020 A1 | 1/2005 | Fremberg | |
| 2005/0182958 A1 | 8/2005 | Pham et al. | |
| 2005/0188423 A1 | 8/2005 | Motsinger et al. | |
| 2005/0210251 A1 | 9/2005 | Nyberg et al. | |
| 2006/0094403 A1 | 5/2006 | Norefors et al. | |
| 2006/0095955 A1 | 5/2006 | Vong et al. | |
| 2006/0179304 A1* | 8/2006 | Han | 713/168 |
| 2006/0248021 A1 | 11/2006 | Jain et al. | |
| 2006/0288411 A1 | 12/2006 | Garg et al. | |
| 2007/0015492 A1* | 1/2007 | Bravo et al. | 455/411 |
| 2007/0067828 A1 | 3/2007 | Bychkov | |
| 2007/0084913 A1 | 4/2007 | Weston | |
| 2007/0107050 A1 | 5/2007 | Selvarajan | |
| 2007/0136573 A1 | 6/2007 | Steinberg | |
| 2007/0136808 A1 | 6/2007 | Xiong | |
| 2007/0143851 A1 | 6/2007 | Nicodemus et al. | |
| 2007/0186099 A1 | 8/2007 | Beck et al. | |
| 2007/0220275 A1* | 9/2007 | Heitzeberg et al. | 713/186 |
| 2007/0234426 A1 | 10/2007 | Khanolkar et al. | |
| 2007/0261112 A1 | 11/2007 | Todd et al. | |
| 2007/0266257 A1 | 11/2007 | Camaisa et al. | |
| 2008/0028447 A1 | 1/2008 | O'Malley et al. | |
| 2008/0172730 A1 | 7/2008 | Sandhu et al. | |
| 2008/0181380 A1 | 7/2008 | Gustave et al. | |
| 2008/0189776 A1 | 8/2008 | Constable | |
| 2008/0209275 A1 | 8/2008 | Kwan et al. | |
| 2008/0270301 A1 | 10/2008 | Jones et al. | |
| 2008/0281737 A1 | 11/2008 | Fajardo | |
| 2008/0318548 A1 | 12/2008 | Bravo et al. | |
| 2009/0037329 A1 | 2/2009 | Coppinger et al. | |
| 2009/0077637 A1 | 3/2009 | Santos et al. | |
| 2009/0094682 A1 | 4/2009 | Sage et al. | |
| 2009/0095588 A1 | 4/2009 | Thomas | |
| 2009/0104889 A1 | 4/2009 | Lotvonen et al. | |
| 2009/0106138 A1 | 4/2009 | Smith et al. | |
| 2009/0300738 A1 | 12/2009 | Dewe et al. | |
| 2010/0024017 A1 | 1/2010 | Ashfield et al. | |
| 2010/0051686 A1 | 3/2010 | Obi | |
| 2010/0095351 A1 | 4/2010 | Liu et al. | |
| 2010/0269162 A1 | 10/2010 | Bravo et al. | |
| 2011/0015449 A1 | 1/2011 | Pendleton et al. | |
| 2011/0039237 A1 | 2/2011 | Skare | |
| 2011/0138483 A1 | 6/2011 | Bravo et al. | |
| 2011/0197070 A1 | 8/2011 | Mizrah | |
| 2011/0225647 A1 | 9/2011 | Dilley et al. | |
| 2011/0277024 A1 | 11/2011 | Begley et al. | |
| 2011/0289576 A1 | 11/2011 | Cheng | |
| 2011/0307366 A1 | 12/2011 | Ahuja et al. | |
| 2012/0011066 A1 | 1/2012 | Telle et al. | |
| 2012/0149334 A1 | 6/2012 | Zhang et al. | |
| 2012/0204241 A1 | 8/2012 | Varsavsky et al. | |
| 2012/0264405 A1 | 10/2012 | Bravo et al. | |
| 2012/0272331 A1 | 10/2012 | Lemaster et al. | |
| 2013/0007859 A1 | 1/2013 | Bravo et al. | |
| 2014/0011561 A1 | 1/2014 | Lutnick et al. | |
| 2014/0016634 A1 | 1/2014 | Khan et al. | |
| 2014/0033279 A1 | 1/2014 | Nimashakavi et al. | |

FOREIGN PATENT DOCUMENTS

| | | |
|---|---|---|
| JP | 10334048 A | 12/1998 |
| JP | 10341224 A | 12/1998 |
| JP | 2001111545 | 4/2001 |
| WO | 0109808 A1 | 2/2001 |
| WO | 2004079499 A2 | 9/2004 |
| WO | 2006103387 A1 | 10/2006 |
| WO | 2008147353 A1 | 12/2008 |

OTHER PUBLICATIONS

Bibbee, U.S. Appl. No. 11/765,193, Office Action Communication, Nov. 29, 2010, 14 pages.
Bibbee, U.S. Appl. No. 11/765,193, Office Action Communication, Jul. 30, 2010, 15 pages.
Bibbee, U.S. Appl. No. 11/765,193, Office Action Communication, Feb. 18, 2010, 15 pages.
Tran, U.S. Appl. No. 11/524,340, Notice of Allowance & Fees Due, Dec. 29, 2009, 11 pages.
Tran, U.S. Appl. No. 11/524,340, Office Action Communication, Jul. 29, 2009, 9 pages.
Tran, U.S. Appl. No. 11/524,340, Office Action Communication, Oct. 31, 2008, 19 pages.
Tran, U.S. Appl. No. 11/524,340, Office Action Communication, May 27, 2008, 22 pages.
Tran, U.S. Appl. No. 11/524,340, Office Action Communication, Apr. 29, 2009, 7 pages.
Bibbee, U.S. Appl. No. 11/765,193, Examiner's Answer, Apr. 16, 2013, 20 pages.
Almeida, U.S. Appl. No. 12/630,875, Office Action, Apr. 17, 2013, 40 pages.

(56) References Cited

OTHER PUBLICATIONS

Lakhia, U.S. Appl. No. 11/753,673, Notice of Allowance, Jun. 18, 2012, 11 pages.
Gee, U.S. Appl. No. 13/084,823, Office Action, IBMC-0395, Mar. 11, 2013, 8 pages.
Leung, "Depress Phishing by CAPTCHA with OTP", Department of Information Engineering The Chinese University of Hong Kong, IEEE 2009, 6 pgs.
Kopsidas et al., "Voice Interactive Personalized Security (VoIPSEC) protocol: Fortify Internet telephony by providing end-to-end security through inbound key exchange and biometric verification", 2006 IEEE, 10 pgs.
Koo et al., "VoIP Interception in P2P SIP Environment", 2010 Ieeee, vol. 1, pp. 331-334.
Megeed, U.S. Appl. No. 12/423,928, Office Action 1, IBMC-0326, 21 pages, Aug. 25, 2011.
Megeed, U.S. Appl. No. 12/423,928, Final Office Action 1, IBMC-0326, 20 pages, Nov. 10, 2011.
Megeed, U.S. Appl. No. 12/423,928, Office Action 2, IBMC-0326, 20 pages, Jun. 8, 2012.
Megeed, U.S. Appl. No. 12/423,928, Notice of Allowance 1, IBMC-0326, 10 pages, Sep. 25, 2012.
Megeed, U.S. Appl. No. 12/423,928, Notice of Allowance 2, IBMC-0326, 19 pages, Dec. 4, 2012.
Lakhia, U.S. Appl. No. 13/432,956, Office Action, Feb. 14, 2013, 26 pages.
Lakhia, U.S. Appl. No. 11/753,673, Office Action, Jan. 8, 2013, 14 pages.
Bibbee, U.S. Appl. No. 11/765,193, Office Action 3, 18 pages, Sep. 19, 2011.
Almeida, U.S. Appl. No. 12/630,875, Notice of Allowance, IBMC-0353, Dec. 20, 2012, 7 pages.
Bibbee, U.S. Appl. No. 11/765,193, Final Office Action 2, 17 pages, May 12, 2011.
Bibbee, U.S. Appl. No. 11/765,193, Final Office Action 3, 18 pages, Apr. 16, 2012.
Almeida, U.S. Appl. No. 12/630,875, Office Action, IBMC-0353, Aug. 30, 2012, 14 pages.
Almeida, U.S. Appl. No. 12/630,875, Office Action, IBMC-0353, Mar. 1, 2012, 17 pages.
Geneiatakis et al., "Survey of Security Vulnerabilities in Session Initiation Protocol", 3rd Quarter 2006, vol. 8, No. 3, IEEE Communications Surveys & Tutorials, pp. 68-81.
Bonzo, U.S. Appl. No. 11/776,619, Office Action, Sep. 30, 2009, 12 pages.
Bonzo, U.S. Appl. No. 11/776,619, Notice of Allowance, Apr. 29, 2010, 10 pages.
Alicherry et al., "DoubleCheck: Multi-ath Verification Against Man-in-the-Middle Attack", IEEE 2009, pp. 557-563.
Kumaraguru et al., "Getting Users to Pay Attention to Anti-Phishing Education: Evaluation of Retention and Transfer", APWG eCrime Researchers Summit, Oct. 4-5, 2007, Pittsburgh, PA pp. 70-81.
Adida, "BeamAuth: Two-Factor Web Authentication with a Bookmark", CCS '07, Oct. 29-Nov. 2, 2007, Alexandria, VA, ACM 978-1-59593-703-2/07/0010, pp. 48-57.
Nassar et al., "Holistic VoIP Intrusion Detection and Prevention System", IPTCOMM '07, ACM 2007, pp. 1-9.
Stoll et al., "Sesame: Informing User Security Decisions with System Visualization", CHI 2008 Proceedings, Am I Safe, Apr. 5-10, 2008, Florence, Italy, pp. 1045-1054.
Ma et al., "Beyond Blacklists: Learning to Detect Malicious Web Sites from Suspicious URLs", KDD '09, Jul. 28-Jul. 1, 2009, pp. 1245-1253.
Lakhia, U.S. Appl. No. 13/432,956, Notice of Allowance & Fees Due, Apr. 15, 2013, 27 pages.
U.S. Appl. No. 12/630,875, Notice of allowance and Fee(s) Due dated Nov. 18, 2013, IBMC-0353, 19 pages.
Almeida, U.S. Appl. No. 12/630,875, Office Action Communication, Aug. 7, 2013, 15 pages.
Vaughan, U.S. Appl. No. 13/613,502, Office Action Communication, Jul. 18, 2013, 54 pages.
Vaughan, U.S. Appl. No. 12/423,928, Notice of Allowance & Fees Due, Jul. 11, 2013, 25 pages.
Lakhia, U.S. Appl. No. 11/753,673, Notice of Allowance & Fees Due, dated May 10, 2013, 28 pages.
U.S. Appl. No. 13/613,502, Notice of allowance and Fee(s) Due dated Jan. 27, 2014, IBMC-0326-CON, 14 pages.
U.S. Appl. No. 13/562,491, Office Action dated May 5, 2014, 64 pages.

\* cited by examiner

VERIFICATION OF TRANSACTIONAL INTEGRITY

REFERENCE TO RELATED APPLICATION

The current application is related to co-owned U.S. Pat. No. 7,715,823 B2, filed on Sep. 20, 2006, and entitled "Methods and Apparatus for Restricting Access of a User Using a Cellular Telephone" and co-owned U.S. Patent Pub. No. 2008/0318548, filed on Jun. 17, 2007, and entitled "Method and System for Strong Authentication and Defense Against Man-in-the-Middle Attacks", each of which is hereby incorporated herein by reference.

FIELD OF THE INVENTION

The subject matter of this invention relates generally to transaction verification. More specifically, aspects of the present invention provide a system and method for verifying the integrity of a commercial transaction.

BACKGROUND OF THE INVENTION

There is an increasing use of electronic media in conducting commercial transactions. These transactions can include such types of transactions as internet banking and electronic commerce, to name a few. However, with the increase of these transactions comes an increased risk that entities without authorization will be able to use the electronic data used in these transactions to benefit themselves and/or harm one or more of the authorized members of the transaction.

Current security solutions attempt to eliminate these unauthorized transactions, but these solutions are deficient with respect to certain type of attack. For example, in one particular type of man-in-the-middle (MITM) type attack, an unauthorized computer program (malware) that has been covertly loaded on a user's computer system or elsewhere along the chain of the transaction could be used to alter the details of a transaction after it has been approved by the user. For example, the malware could alter the details of an online banking transaction that authorized payment of $100 to the electric company in such a way that the new transaction paid $10,000 to the entity that circulated the malware.

SUMMARY OF THE INVENTION

In general, aspects of the present invention provide a solution for verifying the integrity of a transaction. In response to receipt of a confirmed electronic transaction from a user, a one time password is forwarded to the user. The user then initiates a telephonic communication with a verifier on the user's wireless device and provides the one time password to the verifier. The verifier authenticates the mobile telephonic device based on the device's caller identification number and determines whether the one time password provided by the user matches the one forwarded to the user. After the user is authenticated, the verifier communicates the details of the transaction that were received and the user confirms whether the details match those originally entered.

A first aspect of the invention provides a system for verifying the integrity of a transaction, comprising: a password communication module that forwards a one time password to a user upon receipt of a confirmed electronic transaction from the user; an authenticator module that, in response to a telephonic communication from the user regarding the transaction, authenticates a mobile telephonic device used to initiate the telephonic communication based on a caller identification of the mobile telephonic device and authenticates an inputted one time password entered by the user via the telephonic communication based on the forwarded one time password; a detail communication module that facilitates communication of details of the confirmed electronic transaction to the user via the telephonic communication based on the authentication; and a verification module that verifies the transaction based on an indication via the telephonic communication from the user as to whether the details match originally sent details from the user.

A second aspect of the invention provides a method for verifying the integrity of a transaction, comprising: forwarding, upon receipt of a confirmed electronic transaction from a user, a one time password to the user; receiving a telephonic communication from a mobile telephonic device of the user; authenticating the mobile telephonic device as being associated with the user using a caller identification number of the mobile telephonic device; receiving an input of the one time password from the user via the telephonic communication; authenticating an identity of the user based on a comparison of the input one time password with the forwarded one time password; communicating, based on the authenticating, details of the confirmed electronic transaction to the user via the telephonic communication; and verifying the transaction based on an indication via the telephonic communication from the user as to whether the details match originally sent details from the user.

A third aspect of the invention provides a computer program product embodied in a computer readable medium for implementing a method for verifying the integrity of a transaction, the method comprising: forwarding, upon receipt of a confirmed electronic transaction from a user, a one time password to the user; receiving a telephonic communication from a mobile telephonic device of the user; authenticating the mobile telephonic device as being associated with the user using a caller identification number of the mobile telephonic device; receiving an input of the one time password from the user via the telephonic communication; authenticating an identity of the user based on a comparison of the input one time password with the forwarded one time password; communicating, based on the authenticating, details of the confirmed electronic transaction to the user via the telephonic communication; and verifying the transaction based on an indication via the telephonic communication from the user as to whether the details match originally sent details from the user.

A fourth aspect of the present invention provides a method for deploying an application for verifying the integrity of a transaction, comprising, providing a computer system operable to: forward, upon receipt of a confirmed electronic transaction from a user, a one time password to the user; receive a telephonic communication from a mobile telephonic device of the user; authenticate the mobile telephonic device as being associated with the user using a caller identification number of the mobile telephonic device; receive an input of the one time password from the user via the telephonic communication; authenticate an identity of the user based on a comparison of the input one time password with the forwarded one time password; communicate, based on the authenticating, details of the confirmed electronic transaction to the user via the telephonic communication; and verify the transaction based on an indication via the telephonic communication from the user as to whether the details match originally sent details from the user.

Still yet, any of the components of the present invention could be deployed, managed, serviced, etc., by a service provider who offers to control electricity to a device.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, aspects of the present invention provide a solution for verifying the integrity of a transaction. In response to receipt of a confirmed electronic transaction from a user, a one time password is forwarded to the user. The user then initiates a telephonic communication with a verifier on the user's wireless device and provides the one time password to the verifier. The verifier authenticates the mobile telephonic device based on the device's caller identification number and determines whether the one time password provided by the user matches the one forwarded to the user. After the user is authenticated, the verifier communicates the details of the transaction that were received and the user confirms whether the details match those originally entered.

As a result, the current invention provides greater security for electronic transactions. Specifically, the verification of the details of the transaction by the user provides greater security than those provided by simple provider-based assess verification systems currently in existence. This verification as part of the current invention foils man-in-the-middle (MITM) attacks that would have otherwise succeeded under previous solutions.

Figure 1:
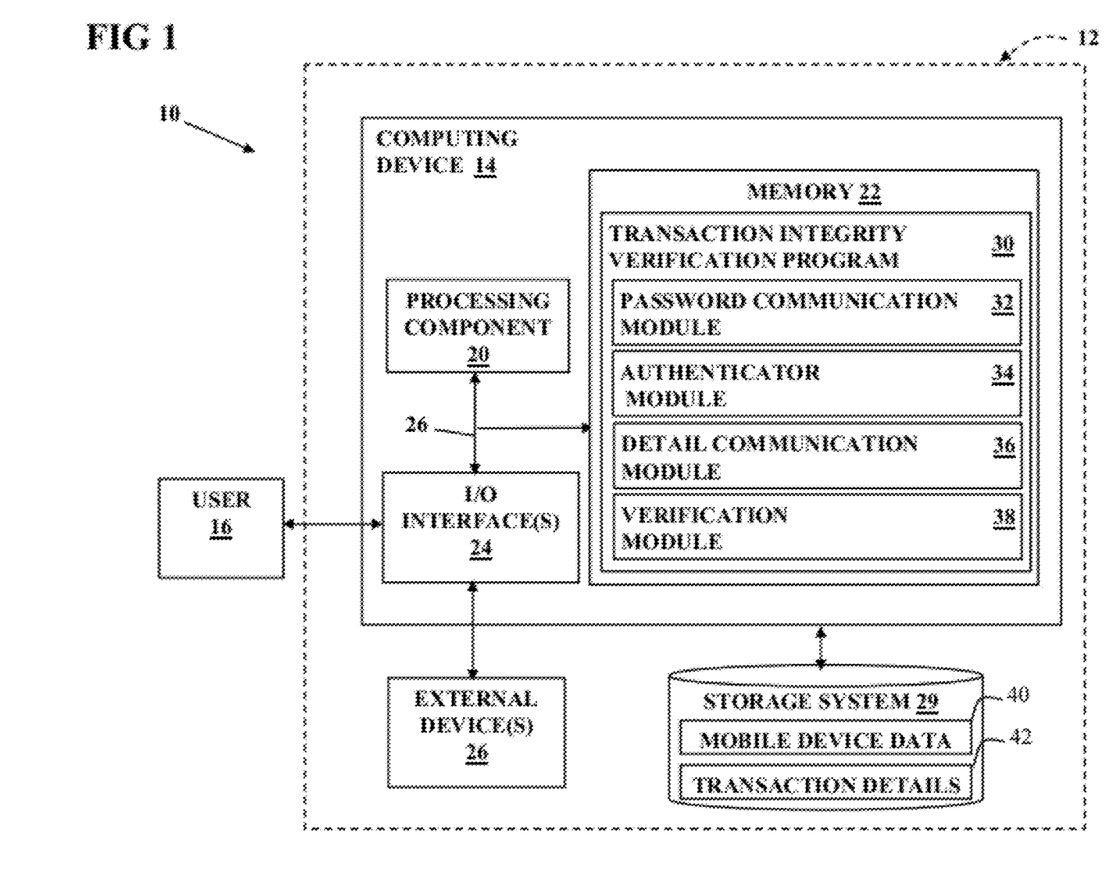
FIG. 1 shows a data processing system suitable for implementing an embodiment of the present invention.

Turning to the drawings, FIG. 1 shows an illustrative environment 10 for verifying the integrity of a transaction according to an embodiment. To this extent, environment 10 includes a computer system 12 that can perform a process described herein in order to verify the integrity of a transaction. In particular, computer system 12 is shown including a computing device 14 that includes a transaction integrity verification program 30, which makes computing device 14 operable to verify the integrity of a transaction by performing a process described herein.

Computing device 14 is shown including a processing component 20 (e.g., one or more processors), a memory 22, a storage system 29 (e.g., a storage hierarchy), an input/output (I/O) interface component 24 (e.g., one or more I/O interfaces and/or devices), and a communications pathway 26. In general, processing component 20 executes program code, such as transaction integrity verification program 30, which is at least partially fixed in memory 22. While executing program code, processing component 20 can process data, which can result in reading and/or writing transformed data from/to memory 22 and/or I/O interface component 24 for further processing. Pathway 26 provides a communications link between each of the components in computer system 12. I/O interface component 24 can comprise one or more peripheral I/O devices, which enable communications with an external device 26. Additionally, or in the alternative, I/O interface component 24 can comprise one or more human I/O devices, which enable a human user 16 to interact with computer system 12 and/or one or more communications devices to enable a system user 16 to communicate with computer system 12 using any type of communications link. To this extent, transaction integrity verification program 30 can manage a set of interfaces (e.g., graphical user interface(s), application program interface, and/or the like) that enable human and/or system users 16 to interact with transaction integrity verification program 30. Further, transaction integrity verification program 30 can manage (e.g., store, retrieve, create, manipulate, organize, present, etc.) the data, such as mobile device data 40 and/or transaction details 42, using any solution.

In any event, computer system 12 can comprise one or more general purpose computing articles of manufacture 14 (e.g., computing devices) capable of executing program code, such as transaction integrity verification program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, transaction integrity verification program 30 can be embodied as any combination of system software and/or application software. In any event, the technical effect of computer system 12 is to provide processing instructions to computing device 14 in order to verify the integrity of a transaction.

Further, transaction integrity verification program 30 can be implemented using a set of modules 32-38. In this case, a module 32-38 can enable computer system 12 to perform a set of tasks used by transaction integrity verification program 30, and can be separately developed and/or implemented apart from other portions of transaction integrity verification program 30. As used herein, the term "component" means any configuration of hardware, with or without software, which implements the functionality described in conjunction therewith using any solution, while the term "module" means program code that enables a computer system 12 to implement the actions described in conjunction therewith using any solution. When fixed in a memory 22 of a computer system 12 that includes a processing component 20, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 12.

When computer system 12 comprises multiple computing devices 14, each computing device can have only a portion of transaction integrity verification program 30 fixed thereon (e.g., one or more modules 32-38). However, it is understood that computer system 12 and transaction integrity verification program 30 are only representative of various possible equivalent computer systems that may perform a process described herein. To this extent, in other embodiments, the functionality provided by computer system 12 and transaction integrity verification program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 12 includes multiple computing devices 14, the computing devices can communicate over any type of communications link. Further, while performing a process described herein, computer system 12 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, transaction integrity verification program 30 enables computer system 20 to verify the integrity of a transaction. To this extent, transaction integrity verification program 30 is shown including a password communication module 32, an authenticator module 34, a detail communication module 36, and a verification module 38.

Figure 2:
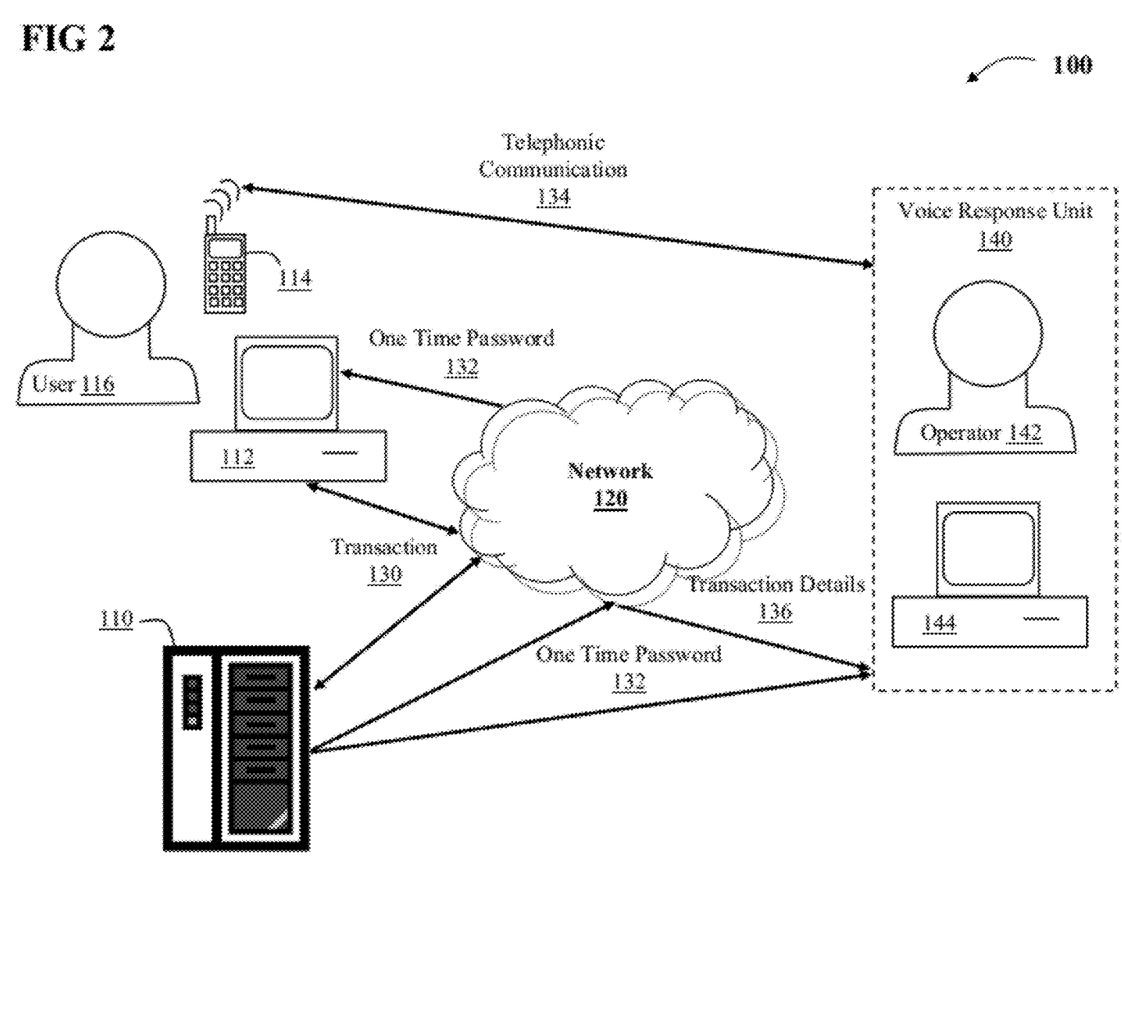
FIG. 2 shows an environment in which transaction integrity is verified according to an embodiment of the present invention.

Referring now to FIG. 2, an environment 100, in which the integrity of a transaction 130 can be verified, is shown. As shown, environment 100 includes a user 116, having both a computer transaction device 112 for conducting transaction 130 and a mobile telephonic device 114 for initiating a telephonic communication 134. User 116 communicates with a transaction partner 110 over a network 120. Transaction partner 110 can include any combination of hardware, software, etc., now known or later developed that is capable of carrying out transaction 130 with user 116, including, but not limited to a transaction 130 involving online banking, electronic commerce, etc. Network 120 can include any network for carrying data, such as transaction 130, including wired, wireless, internet, intranet, etc. Further, while computer transaction device 112 and mobile telephonic device 114 are shown as being different devices, it should be understood by those skilled in the art, that the functions of computer transaction device 112 and mobile telephonic device 114 could be performed by the same device. For example, this could occur in the case that mobile telephonic device 114 also had computational features, including, but not limited to network access features that allowed mobile telephonic device 114 to communicate over a network 120 to perform a transaction 130.

Environment 100 also includes a voice response unit 140 that verifies the integrity of transaction 130. As shown, voice response unit 140 includes an operator 142 and a verification computer device 144 that enables operator 142 to verify the integrity of transaction 130. Voice response unit 140 can be, as illustrated, a third party entity that is separate from transaction partner 110, including, but not limited to a telephone carrier that provides service for mobile telephonic device 114. In the alternative, voice response unit 140 could be associated with transaction partner 110 in, for example, the same company, location, etc. While environment 100, as illustrated, shows a human operator 142, it should be understood, that in some embodiments, the functions of operator 142 could be performed by a computer, such as an automated answering service, working in conjunction with verification computer device 144.

In any case, referring now to FIG. 1 in conjunction with FIG. 2, computer system 12 (e.g., password communication module 32) communicates a one time password 132 to a user 116 upon receipt of electronic transaction 130 that has been completed. Specifically, prior to communication of one time password 132, user 116 accesses transaction partner 110 using computer transaction device 112 over network 120. This access can be performed by any solution now known or later developed for a device to establish a communication with another device, including but not limited to, a web page, a web portal, an electronic mail message, a dedicated pipeline, etc. In any case, user 116 can establish user's 116 identity with transaction partner 110 with a login or other known solution, and user 116 can communicate with transaction partner 110 to provide transaction partner 110 with details of transaction 130. For example, if transaction 110 is a banking transaction to pay a bill of user 116, user 116 could specify an amount for payment (e.g., $100) and information indicating to whom the payment should be made (e.g., WOW Electric). Details of transaction 130 could have any number of items and could include any items that can be used to facilitate a transaction, such as transaction amount, transaction destination, transaction source account, transaction destination account, transaction source institution, transaction currency used, transaction date, etc.

In any event, after the details have been entered by user 116, user 116 will communicate the details to transaction partner 110 along with a confirmation for processing transaction 130. In response, transaction partner 110 communicates one time password 132 to user 116 via network 120. One time password 132 is unique to transaction 130. As such, one time password 132 can only be used to verify the particular transaction 130 for the particular user 116 to which transaction partner 110 has communicated it. In one environment, one time password 132 is an alphabetic, numeric, or alphanumeric string, although other embodiments are envisioned. Transaction partner 110 can also forward a telephonic identifier to user 116 that user 116 can use to contact voice response unit 140. This telephonic identifier could be a standard telephone number having 7, 10 or other standard number of digits. In the alternative, the telephonic identifier could a mobile telephone carrier based service message. In this case, a number, which is often preceded by a character, such as "*" or "#" is routed directly by the telephone carrier that user 116 uses in conjunction with mobile telephonic device 114 to a predetermined location associated with voice response unit 140.

Transaction partner 110 also, upon receipt of the confirmed transaction 130, can forward one time password 132 and transaction details 136 of the confirmed transaction 130 to voice response unit 140. As shown, one time password 132 and/or transaction details 136 could be communicated to voice response unit 140 over network 120, or, in the alternative one or both could be communicated by an alternate solution, such as an internal network, dedicated connection between transaction partner 110 and voice response unit 140, or other secure manner of communication. It should be understood the one time password 132 that is communicated from transaction partner 110 to voice response unit 140 corresponds to one time password 132 that has been communicated to user 116. To this extent, each of the one time passwords 132 associated with transaction 130 could be identical. In the alternative, the one time password 132 forwarded to user 116 could include a key that decrypts the one time password 132 forwarded to voice response unit 140, or vice versa. It should also be understood that in most cases transaction details forwarded from transaction partner 110 to voice response unit 140 would match the details of transaction 130 communicated from user 116 to transaction partner 110. However, in the case that the details of transaction 130 have been altered subsequent to confirmation by user 116 but prior to receipt by transaction partner 110, the details will be different from transaction details 136 received by transaction partner 110 and forwarded from transaction partner 110 to voice response unit 140.

Referring still to FIG. 1 in conjunction with FIG. 2, computer system 12 (e.g., authenticator module 34) authenticates the identity of user 116 at voice response unit 140. Specifically, user 116 uses the telephonic identifier previously forwarded to user 116 from transaction partner 110 to initiate telephonic communication 134 with voice response unit 140 using mobile telephonic device 114. Upon receipt of telephonic communication 134 by voice response unit 140, authenticator module 34 authenticates mobile telephonic device 114. This can be accomplished by comparing the caller identification information that identifies the incoming telephone number of mobile telephonic device 114 in telephonic communication 134 with mobile device data 40 that is on record with voice response unit 140, such as in mobile device data 42 of storage system 29 (FIG. 1), as being associated with user 116. The fact that mobile telephonic device 114 is a mobile device (e.g., a cellular telephone) makes the authentication of telephonic communication 134 as originating with user 116 that is performed by authenticator module 34 more accurate. This is because it is currently more difficult to spoof, or impersonate the identity of a caller when the telephonic device is a mobile phone than when it is a land line. Furthermore, the fact that mobile telephonic device 114 is unique to user 116 and carried by user 116 makes mobile telephonic device a more secure source of authentication that a land line, which can often be shared. In addition the portability associated with mobile telephonic device provides added convenience to user 116 during the validation process.

Authenticator module 34 can then authenticate user 116 on a transaction 130 level using one time password 132. To accomplish this, user 116 can be prompted to enter the one time password 132 that transaction partner 110 previously sent to user 116 upon confirmation of transaction 130. Authenticator module 34 can then compare the input one time password 132 with the one time password that was sent from transaction partner 110 to voice response unit 140. If the one time password 132 provided by user 116 corresponds to the one time password sent from transaction partner 110, voice response unit 140 can authenticate user 116 for transaction 130.

Once user 116 is authenticated, computer system 12 (e.g., detail communication module 36) facilitates communication of transaction details 136 of confirmed transaction 130 to user 116 on mobile telephonic device 114 via telephonic communication 134. To accomplish this, voice response unit 140 can access stored transaction details 136 that were previously communicated to voice response unit 140 from transaction partner 110 and stored. These transaction details 136 can be retrieved using verification computer device 144, by searching stored transaction details 42 using one time password 132 as a key. Once retrieved by voice response unit 140, transaction details 136 can be communicated to user 116 by a human operator 142, or, in the alternative, by a computerized operator 142 utilizing a speech simulator to convert stored transaction details 42 to speech and communicating transaction details 136 to mobile telephonic device 114 of user 116 over telephonic communication 134. In an alternative embodiment, detail communication module 36 can receive a communication from user 116 over telephonic communication 134 that reiterates transaction details 136 of transaction 130 rather than voice response unit 140 communicating stored transaction details 42 to user 116.

After transaction details 136 have been communicated, computer system 12 (e.g., verification module 38) verifies the integrity of confirmed transaction 130. A comparison is made over telephonic communication 134 between transaction details 136 from user 116 and stored transaction details 42 that have been sent from transaction partner 110 to voice response unit 140. Based on the comparison, an indication can be made as to whether stored details 42 match transaction details 136 originally received from user 116. In an embodiment in which stored transaction details 42 have been communicated to user 116, it could be user 116 that performs the verification and makes the indication to voice response unit 140. In the alternative, in the case that user 116 communicates transaction details 136 to voice response unit 140, voice response unit 140 could perform the verification and make the indication. Furthermore, in either embodiment, the verification and indication could be performed by a combination of user 116 and voice response unit 140.

For example, assume original transaction details 136 include:
Pay from bank account;
Amount of $100; and
To WOW Energy.

Then, if transaction 130 has not been altered, stored transaction details 42 will match original transaction details 136 and there will be an indication from verification module 38 to that effect. This indication could be made by user 116 and/or operator 140 via telephonic communication 134. Based on the indication, verification module 38 could complete the transaction.

However, if, in the alternative, stored transaction details 42 are as follows:
Transfer from bank account;
Amount of $10,000; and
To Nefarian Co, then the indication from verification module 38 would be that there is no match. In this case, the details of transaction 130 have been altered subsequent to confirmation by user 116 but prior to receipt by transaction partner 110. Thus, the details will be different from transaction details 136 received by transaction partner 110 and forwarded from transaction partner 110 to voice response unit 140. User 116 could be given the opportunity to abort the transaction (such as by pressing the digit 1 to cancel via telephonic communication 134, for example). It could then be deduced from this indication that data had been modified by a MITM attack, transaction 130 could be aborted, and further investigation as to the source could be conducted.

While shown and described herein as a method and system for verifying the integrity of a transaction, it is understood that aspects of the invention further provide various alternative embodiments. For example, in one embodiment, the invention provides a computer program fixed in at least one computer-readable medium, which when executed, enables a computer system to verify the integrity of a transaction. To this extent, the computer-readable medium includes program code, such as transaction integrity verification program 30 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as transaction integrity verification program 30 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for verifying the integrity of a transaction. In this case, a computer system, such as computer system 12 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "approximately" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to approximately 25 wt %, or, more specifically, approximately 5 wt % to approximately 20 wt %", is inclusive of the endpoints and all intermediate values of the ranges of "approximately 5 wt % to approximately 25 wt %," etc).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

We claim:

1. A system for preventing man-in-the-middle (MITM) attacks, the system comprising at least one computer device that performs a method comprising:
forwarding a transaction-specific onetime password and a telephonic identifier to a user upon receipt of a confirmed electronic transaction from the user, wherein the telephonic identifier includes an authentication telephone number routed directly to a predetermined location;
storing a set of confirmed details for the transaction, wherein the set of confirmed details includes the transaction-specific onetime password, a confirmed transaction source, and a confirmed transaction destination;
in response to a telephonic communication from the user regarding the transaction, authenticating a mobile telephonic device used to initiate the telephonic communication based on a caller identification of the mobile telephonic device and the telephonic identifier;
authenticating an inputted one time password entered by the user via the telephonic communication based on the forwarded transaction-specific onetime password;
facilitating verbal communication of user-submitted details of the confirmed electronic transaction from the user via the telephonic communication based on the authentication, wherein the user-submitted details include a submitted transaction source and a submitted transaction destination;
identifying the set of confirmed details for the transaction by reference to the transaction-specific onetime password; and
verifying the transaction based on an indication via the telephonic communication and the verbal communication from the user as to whether the user-submitted details from the user match the confirmed details for the transaction.

2. The system of claim 1, the method further comprising the electronic transaction if the indication is that the details match, and aborting the electronic transaction if the indication is that the details do not match.

3. The system of claim 1, wherein the telephonic communication is performed using a mobile telephonic carrier-based service message.

4. The system of claim 1, wherein the authenticating is performed by a third party who is not a participant in the electronic transaction.

5. The system of claim 1, wherein the electronic transaction is selected from the group comprising: an online banking transaction or an electronic commerce transaction.

6. The system of claim 1, wherein the forwarded one time password further comprises a decryption key, and the comparison of the input one time password with the forwarded one time password includes decrypting the input one time password.

7. The system of claim 1, wherein the verifying is performed using a voice response unit having an operator and a verification computer device.

8. The system of claim 1, wherein the facilitating includes verbal communication of details of the confirmed electronic transaction both from the user and to the user via the telephonic communication based on the authentication, and the verifying is based on the indication via the telephonic transaction and the verbal communication of details of the confirmed electronic transaction both from the user and to the user.

9. A method for preventing man-in-the-middle (MITM) attacks, the method comprising:
forwarding, upon receipt of a confirmed electronic transaction from a user, a transaction-specific onetime password and a telephonic identifier to the user, wherein the telephonic identifier includes an authentication telephone number routed directly to a predetermined location;
storing a set of confirmed details for the transaction, wherein the set of confirmed details includes the transaction-specific onetime password, a confirmed transaction source, and a confirmed transaction destination;
receiving a telephonic communication from a mobile telephonic device of the user;

authenticating the mobile telephonic device as calling the authentication telephone number and being associated with the user using a caller identification number of the mobile telephonic device;

receiving an input of the transaction-specific onetime password from the user via the telephonic communication;

authenticating an identity of the user based on a comparison of the input one time password with the forwarded one time password;

receiving a verbal communication from the user of user-submitted details of the confirmed electronic transaction via the telephonic communication, wherein the user-submitted details include a submitted transaction source and a submitted transaction destination;

identifying the set of confirmed details for the transaction by reference to the transaction-specific onetime password; and verifying the transaction based on an indication via the telephonic communication and the verbal communication from the user as to whether the user-submitted details match the confirmed details for the transaction.

10. The method of claim 9, wherein the electronic transaction is completed if the indication is that the details match, and wherein the electronic transaction is aborted if the indication is that the details do not match.

11. The method of claim 9, wherein the telephonic communication is performed using a mobile telephonic carrier-based service message.

12. The method of claim 9, wherein the authenticating is performed by a third party who is not a participant in the electronic transaction.

13. The method of claim 9, wherein the electronic transaction is selected from the group comprising: an online banking transaction or an electronic commerce transaction.

14. The method of claim 9, wherein the forwarded one time password further comprises a decryption key, and the comparison of the input one time password with the forwarded one time password includes decrypting the input one time password.

15. A computer program product embodied in a computer readable storage medium for implementing a method for preventing man-in-the-middle (MITM) attacks, the method comprising:

forwarding, upon receipt of a confirmed electronic transaction from a user, a transaction-specific onetime password and a telephonic identifier to the user, wherein the telephonic identifier includes an authentication telephone number routed directly to a predetermined location;

storing a set of confirmed details for the transaction, wherein the set of confirmed details includes the transaction-specific onetime password, a confirmed transaction source, and a confirmed transaction destination;

receiving a telephonic communication from a mobile telephonic device of the user;

authenticating the mobile telephonic device as calling the authentication telephone number and being associated with the user using a caller identification number of the mobile telephonic device;

receiving an input of the transaction-specific onetime password from the user via the telephonic communication;

authenticating an identity of the user based on a comparison of the input one time password with the forwarded one time password;

receiving a verbal communication from the user of user-submitted details of the confirmed electronic transaction via the telephonic communication, wherein the user-submitted details include a submitted transaction source and a submitted transaction destination;

identifying the set of confirmed details for the transaction by reference to the transaction-specific onetime password; and verifying the transaction based on an indication via the telephonic communication and the verbal communication from the user as to whether the user-submitted details match the confirmed details for the transaction.

16. The program product of claim 15, wherein the electronic transaction is completed if the indication is that the details match, and wherein the electronic transaction is aborted if the indication is that the details do not match.

17. The program product of claim 15, wherein the telephonic communication is performed using a mobile telephonic carrier-based service message.

18. The program product of claim 15, wherein the authenticating is performed by a third party who is not a participant in the electronic transaction.

19. The program product of claim 15, wherein the electronic transaction is selected from the group comprising: an online banking transaction or an electronic commerce transaction.

20. The program product of claim 15, wherein the forwarded one time password further comprises a decryption key, and the comparison of the input one time password with the forwarded one time password includes decrypting the input one time password.

* * * * *